No. 782,225. PATENTED FEB. 14, 1905.
R. H. ELKINS.
LUBRICATING MACHINE.
APPLICATION FILED NOV. 24, 1902.
4 SHEETS—SHEET 2.
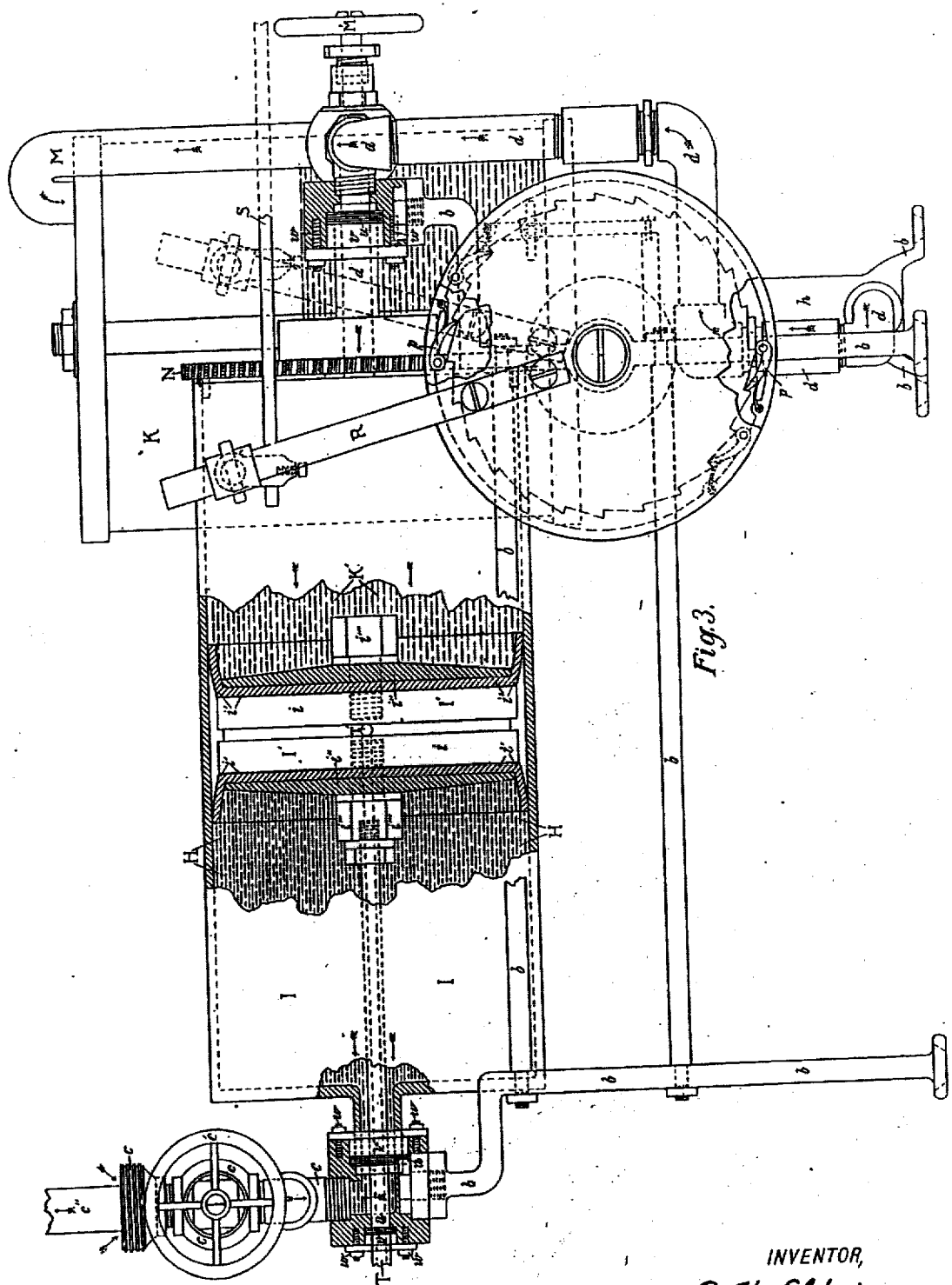
WITNESSES:
Paul A. Viersen.
Alexander Smith.
INVENTOR,
R. H. Elkins,
BY
H. C. Gardiner.
ATTORNEY.

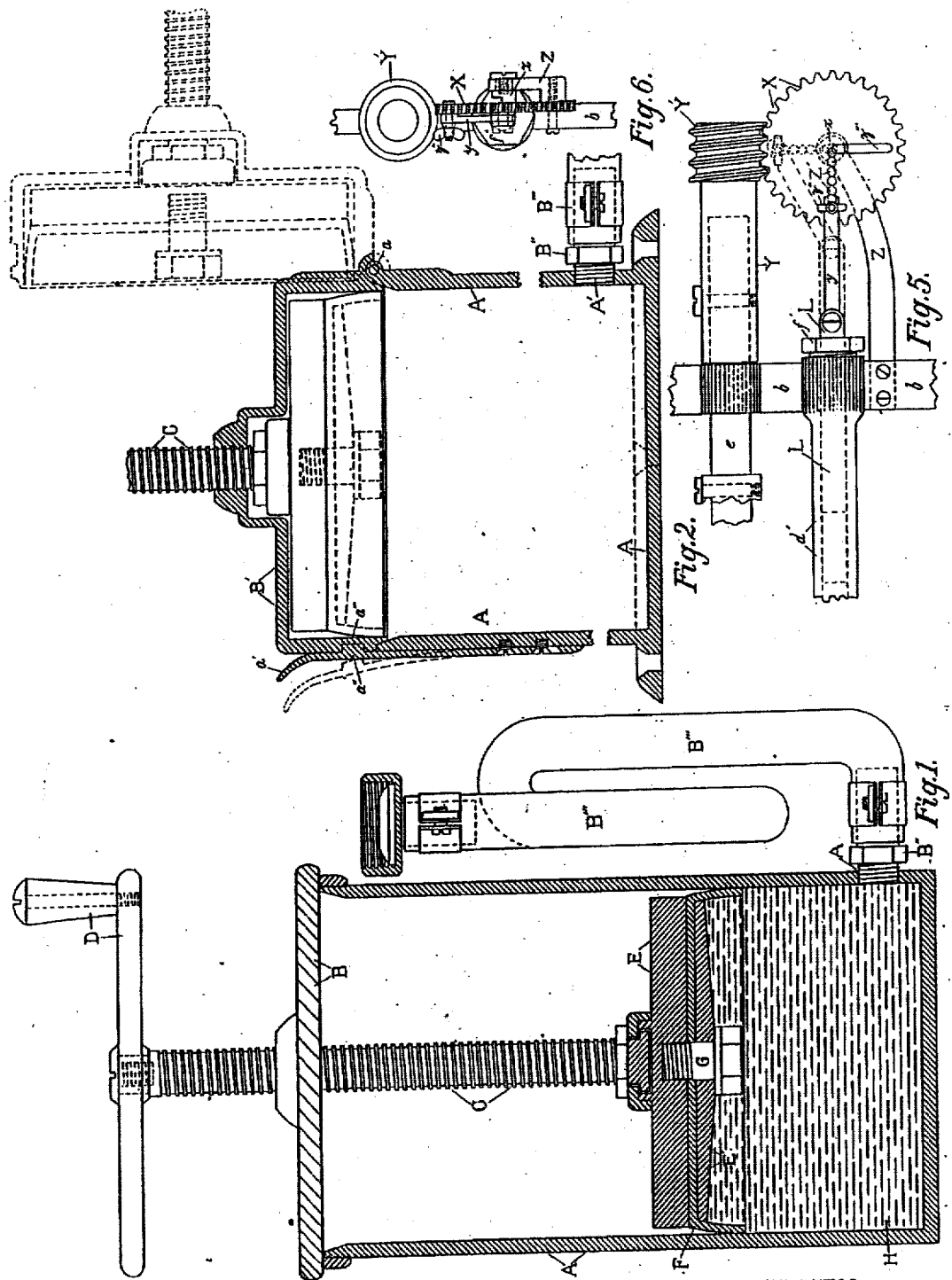

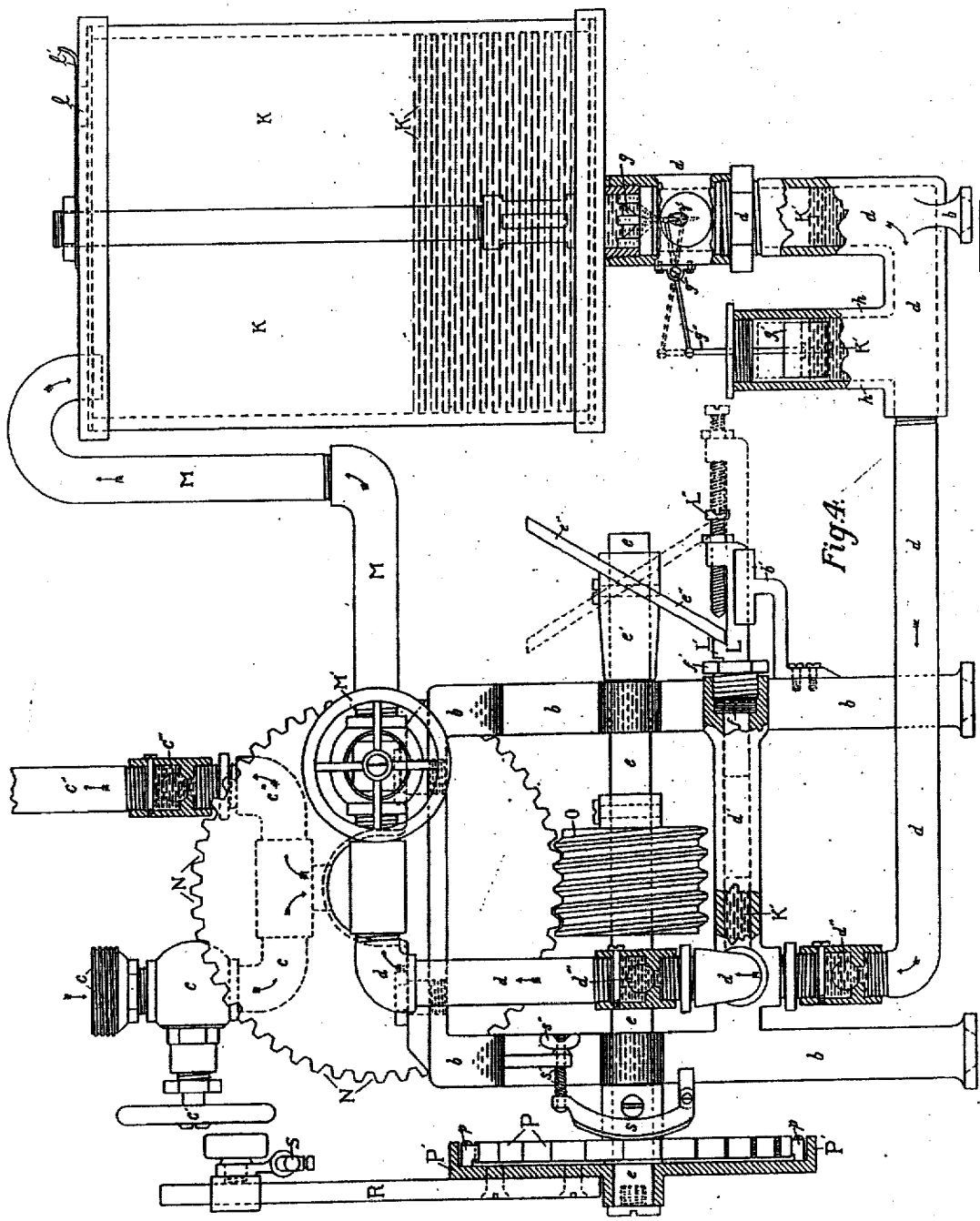

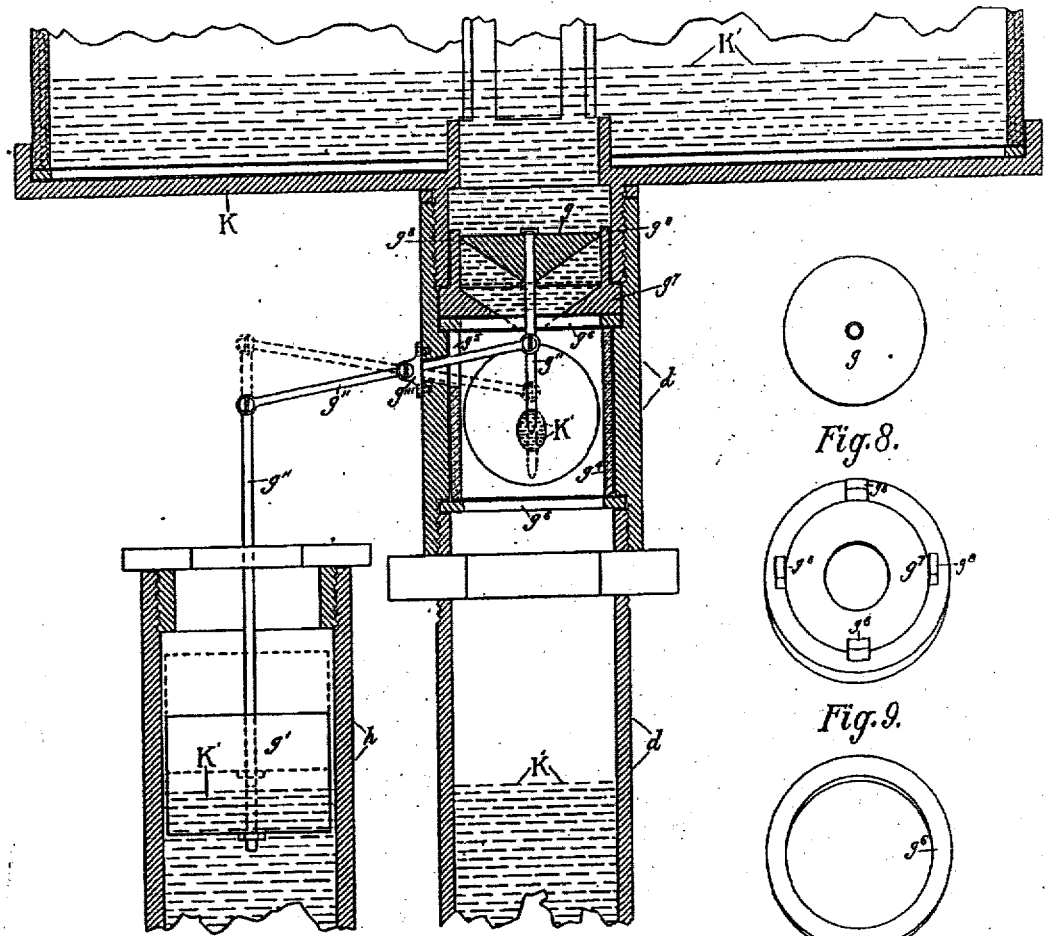
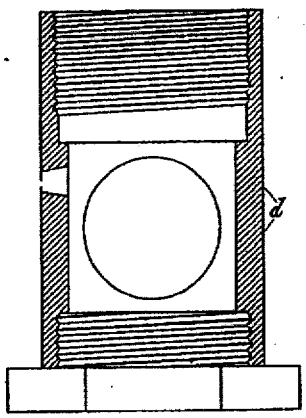
Fig. 11.     Fig. 7.     Fig. 10.
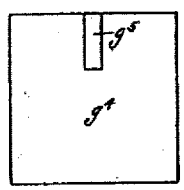
Fig. 12.
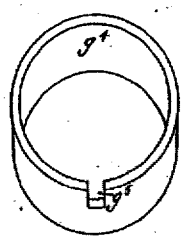
Fig. 13.
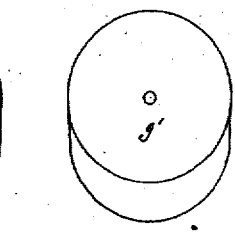
Fig. 14.

No. 782,225.

Patented February 14, 1905.

UNITED STATES PATENT OFFICE.

ROLAND H. ELKINS, OF SIOUX CITY, IOWA.

LUBRICATING-MACHINE.

SPECIFICATION forming part of Letters Patent No. 782,225, dated February 14, 1905.

Application filed November 24, 1902. Serial No. 132,587.

*To all whom it may concern:*

Be it known that I, ROLAND H. ELKINS, a citizen of the United States, residing at Sioux City, in the county of Woodbury and State of Iowa, (whose post-office address is Sioux City, Iowa,) have invented a new and useful Lubricating-Machine; and I do declare the following to be a full, clear, and exact description of the same, reference being had to the accompanying drawings, forming a part thereof.

My invention relates to devices used in the application of lubricators to machinery, and is especially adapted to the purpose of applying graphite mixed with oil, or other similar lubricants, to the cylinders of steam-engines.

The object of my invention is to provide means for automatically and continuously lubricating the operating parts of the machinery from a receptacle first supplied with the lubricating material.

The invention comprises a filler from which the lubricant is supplied and a lubricating-machine which feeds the lubricant as required; and it consists in the novelty of construction, arrangement, and combination of parts, as will be hereinafter specifically described, and pointed out in the claims.

Reference is now had to the accompanying drawings, forming a part of this specification, in which—

Figure 1 is a view of filler or can containing the lubricant to be supplied to the lubricating-machine. Fig. 2 is a view of the same kind of can, but provided with a different form of cover. Fig. 3 is a side view of machine, shown partly in section, used in the automatic application of the lubricant. Fig. 4 is an end view of the same. Fig. 5 is a side view of one form of pump-rod used in the operation of the machine. Fig. 6 is an end view of the same. Fig. 7 is a detail view of float mechanism which regulates the supply of liquid used in feeding the lubricant. Fig. 8 shows the valve at the entrance of the pipe to the cup containing the liquid. Fig. 9 is the seat for said valve. Fig. 10 is one of the washers at either end of the glass tube used in the sight-feed. Fig. 11 is an enlarged view of a portion of the pipe leading from the can containing the liquid and shows the seat of the glass tube. Fig. 12 is a side view of glass tube, and Fig. 13 is a perspective view of the tube same. Fig. 14 is a perspective view of float used in the regulation of the supply of liquid.

Referring now to the illustrations, in which like parts are designated by similar letters of reference, A is a filler or can from which the lubricant is supplied to the lubricating-machine as it becomes exhausted in use. It is made of any suitable material and size and is supplied with a screw-top cover B. The cover has a round opening in the center provided with screw-threads, and through said opening passes a rod, C, having screw-threads corresponding to the threads in said opening. The upper end of the rod has a crank D. To the lower end is secured a head E, provided on the lower side with a washer F, secured to the head by means of the follower E' and screw G, all of which constitute a plunger to force the lubricant H out of the filler. At the side of the filler near the bottom is a round opening A', fitted with a pipe B'', having screw-threads to which is attached a hose B''', which when the lubricant is to be forced from the filler into the cylinder or receptacle of the lubricating-machine is attached to a pipe connecting therewith. The lubricant is forced out of the filler through the hose and into said cylinder by turning the crank D and pressing the plunger down upon the lubricant which seeks escape through the hose.

In Fig. 2 is shown the filler with a different form of cover. Instead of being screwed on the cover B' is fitted on one side with a hinge *a*, while on the other side is a spring *a'*, provided with a lug *a''*, adapted to fit a groove *a'''*. When required to replenish the filler with lubricant, the plunger is raised to the top of the can, when the cover and all can be turned back, as seen by the dotted lines, and the lubricant emptied in through the open top.

In Figs. 3 and 4 is shown the machine for forcing the lubricant into the cylinder of the engine or other machinery after being supplied from the filler. It consists, first, of a cylinder or can I, supported upon suitable framework *b b*. A pipe *c*, to which the hose B''' may be attached, leads into the cylinder I, and through this pipe the lubricant is supplied to said cylinder from the filler as it becomes exhausted from the machine. Near the upper end of the pipe $c$ is a valve $c'$, which is to be closed after the lubricant is supplied. The pipe $c''$ leads off from the pipe $c$ to the steam-cylinder or other machinery necessary to be lubricated, while the check-valve $c'''$ prevents any return of the lubricant. The lubricant is supplied from the cylinder I to the machinery in the following manner: Fitting tightly within the cylinder is a double plunger I' I', consisting of the heads $i$ $i$, washers $i''$ $i''$, followers $i'''$ $i'''$, and screws $i''''$ $i''''$, facing in opposite directions. On one side of the plunger is the lubricant H, and on the other side is oil, water, or other suitable liquid K', pumped into the cylinder for the purpose of forcing the lubricant, by means of the double plunger, out at the opposite end through the pipe $c''$. The cup K, containing the liquid K', communicates with the cylinder I by means of the pipe $d$. The natural tendency of the liquid to seek its level is assisted by the pump-rod L, operating in the pump-barrel or branch pipe $d'$. The pump is operated in the following manner: A shaft $e$, parallel with the branch pipe $d'$, is adapted to revolve, by means presently described, in suitable bearings on the framework. Secured to the hub $e'$, which is keyed upon the shaft, is a wheel $e''$, set at an angle of nearly forty-five degrees to the shaft and pump-rod, and as the wheel revolves with the shaft it operates against a shoulder L' on one side of the outer end of the plunger, pushing it inward and against the liquid in the pipe and forcing the liquid up in the pipe $d$ and into the cylinder. A thumb-screw L'' in the outer end of the pump-rod may be used to regulate the length of the stroke, and a brace $b'$ supports the pump-rod in its outward stroke. To avoid leakage, the outer end of the branch pipe is provided with the usual packing $f$ and retaining-nut $f'$. On opposite sides of the entrance of the pipe $d'$ to the pipe $d$ are check-valves $d''$ and $d'''$, which prevent the backward flow of the liquid. At the opening of the cup K into the pipe $d$ is a valve $g$, which regulates the supply of the liquid in the pipe $d$ by means of the float $g'$ in the stand-pipe $h$. The usual jointed rod $g''$, pivotally attached at the point $g'''$ to the pipe $d$, connects the valve with the float. A glass tube $g^4$ is fitted in the pipe $d$ near the upper end, where the pipe enters the cup, and there being a round opening in the pipe opposite the tube, as seen more clearly in Fig. 11, the supply of liquid may be observed through the glass. A slot $g^5$ is made in the tube to permit the operation of the lever $g''$, and a corresponding slot is made in the pipe $d$. The washers $g^6$ at both ends of the tube hold it firmly in place and protect it from breakage. A seat $g^7$, having the guide-posts $g^8$ $g^8$, is provided for the valve $g$. Where the pipe $d$ turns to enter the cylinder I, another pipe, M, branches off and enters the cup K at the top of said cup. At the lower end of the pipe M is a valve M', which is always to be closed except when the lubricant is being supplied to the cylinder by means of the filler. When the filler is connected with the cylinder by means of the hose, the plunger E screwed down upon the lubricant, and the latter forced into the cylinder I, the plunger I', which when the lubricant is exhausted is located in the left end of the cylinder and the rest of the cylinder filled with the liquid, is pushed to the right and forces the liquid to flow back into the pipe $d$. The valve $d'''$ stops the downward flow, and the valve M' being open the liquid seeks an outlet through the pipe M into the cup K. The liquid can thus be repeatedly utilized, but as it becomes exhausted can be supplied to the cup through the opening $l$, having the cover $l'$.

In the use as a lubricant of graphite mixed with oil it is necessary that it be kept constantly agitated to prevent settling of the graphite to the bottom. This is provided for by means of a cogged wheel N, secured to the right end of the cylinder I and adapted to mesh with a worm-wheel O, firmly secured to the revolving shaft $e$, which in connection with the worm-wheel and cogged wheel keeps the cylinder constantly turning, thus agitating the lubricant. This shaft is revolved by means of a ratchet-wheel P, firmly secured to the shaft near the left end, a rim-wheel P' encircling said ratchet-wheel and adapted to turn on the shaft as an axis, the pawls $p$ $p$, attached to the rim-wheel P', adapted to engage the ratchet-wheel, the arm R, secured to the rim-wheel, and the connecting-rod S, pivotally secured to the outer end of the arm and adapted for connection at its opposite end with an oscillating part of the machinery with which the lubricating-machine is connected. A spring $s$, controlled by a coil-spring $s'$ and adapted for regulation by a thumb-screw $s''$, acts as a brake upon the ratchet-wheel and steadies it in its revolutions. As the cylinder revolves and the pipes $c$ and $d$, which enter the cylinder, are stationary, joints with suitable packing are provided where said pipes enter the cylinder, and the pipes being supported by the framework furnish an axis on which the cylinder turns.

As will be seen, the construction just described causes the cylinder containing the lubricant to revolve and at the same time operates the pump, which forces the liquid into the cylinder and presses out the lubricant as needed for the machinery.

The plunger-heads $i$ $i$, Fig. 3, are somewhat smaller than the cylinder and permit a quantity of air to enter around the plunger-heads through the tube T, which enters the cylinder through the pipe $c$ and the opening T' in the plunger-heads, which communicates with said tube. By maintaining atmospheric pressure between the plunger-heads the pressure of the liquid will force the packing of the plunger-heads into more intimate contact with the interior of the cylinder, and thereby prevent leakage.

The joints in the pipes c and d, where there is liability of leakage of the lubricant, are protected with suitable packing u u and the packing glands and bolts v v and w w, respectively.

In Figs. 5 and 6 is shown a means for working the pump when the speed of the operating-shaft is too high to be applied in the manner previously described. The hub e' and the wheel e'' are removed and another hub, Y, having secured to it a worm-wheel Y', is firmly secured to the shaft in its place. Instead of the plunger-rod with shoulder and thumb-screw a piston-rod y is pivotally secured to the outer end of the plunger-rod and at the opposite end pivotally secured, by means of the thumb-screw z'', to one of the bearings Z' in the cogged drive-wheel X, which meshes with the worm-wheel Y'. The drive-wheel revolves upon an axis x, supported by a brace z, extending outward from the framework. If desired to regulate the stroke of the rod more closely than can be done in the bearings, the thumb-screw may be set in the slot z''' in the wheel.

Having described my invention, what I claim as new, and desire to secure by Letters Patent, is—

1. A cylinder, supported in suitable bearings, containing lubricant for supplying operating machinery, a plunger in said cylinder adapted to force out said lubricant as needed, a tube leading from the outer air to the central part of said plunger, a cup containing liquid communicating with the said cylinder and means for forcing said liquid into the cylinder and pressing out the lubricant, means for constantly agitating said lubricant by causing the cylinder to revolve and consisting of a cogged wheel secured to one end of said cylinder and a worm-wheel secured to a revolving shaft meshing together, a ratchet-wheel secured to said shaft, a wheel adapted to turn on said shaft, pawls secured to said wheel adapted to engage said ratchet-wheel, a brake controlled by a spring adapted to steady the ratchet-wheel in its revolutions, and means for connecting said revolving wheel with the operating part of the machinery, substantially as described.

2. In a lubricating-machine, a cup containing liquid, a cylinder adapted to contain a lubricant and having a pipe leading from one end thereof to the machinery, a pipe connecting the opposite end of said cylinder with the lower part of said cup, a stand-pipe communicating therewith, a valve at the outlet of said cup, a float in said stand-pipe, a rod pivotally connected thereto and having pivotal connection with said valve, said valve and float being adapted to regulate the supply of liquid from said cup, a movable plunger in said cylinder separating the lubricant from the liquid, and means for forcing the liquid from said cup into the cylinder and pressing out the lubricant, substantially as described.

3. A cylinder containing lubricant for supplying operating machinery and supported in suitable bearings, a cup containing liquid, a pipe connecting said cup with the cylinder, a movable plunger in the cylinder separating the lubricant from the liquid, check-valves in said pipe to prevent the backward flow of the liquid, a branch pipe communicating with said connecting-pipe, a pump-rod operating in said branch pipe, a rod pivotally secured at one end to the outer end of said pump-rod and at the other end pivotally secured to a cogged drive-wheel, a cogged drive-wheel having bearings therein for the adjustment of said rod, a wheel adapted to mesh with said drive-wheel firmly secured to a revolving shaft, and means connected with the operating machinery for turning said shaft, substantially as described.

4. In a lubricating-machine, a cylinder, supported in suitable bearings, adapted to contain a lubricant in one end thereof, a cup containing liquid and a pipe connecting the lower part of said cup with the other end of said cylinder, valves in said pipe to prevent the backward flow of said liquid, a movable plunger in said cylinder separating the lubricant from the liquid, a pump attached to said pipe capable of forcing the liquid from the cup into the cylinder, means connected with the operating machinery for working said pump and revolving said cylinder, a pipe leading from the end of said cylinder containing the liquid to the top of said cup, and a valve in said pipe for stopping the flow of the liquid, substantially as described.

5. In a device for feeding lubricant, a movable lubricant chamber or reservoir, means for moving the same to agitate the lubricant and means for expelling the lubricant, substantially as described.

6. In a device for feeding lubricant, a rotatable lubricant chamber or reservoir, means for rotating the same, and a plunger within said chamber for expelling the lubricant with means for operating it, substantially as described.

In witness whereof I have hereunto subscribed my name in the presence of two witnesses.

ROLAND H. ELKINS.

Witnesses:
R. H. GOLLOY,
H. C. GARDINER.